United States Patent
Ohr et al.

(10) Patent No.: US 10,337,564 B2
(45) Date of Patent: Jul. 2, 2019

(54) SEGMENTED WEDGE CLUTCH WITH STEPPED RETAINING SPRING

(71) Applicant: SCHAEFFLER TECHNOLOGIES AG & CO. KG, Herzogenaurach (DE)

(72) Inventors: Carsten Ohr, Charlotte, NC (US); Brian Lee, York, SC (US)

(73) Assignee: SCHAEFFLER TECHNOLOGIES AG & CO. KG, Herzogenaurach (DE)

( * ) Notice: Subject to any disclaimer, the term of this patent is extended or adjusted under 35 U.S.C. 154(b) by 286 days.

(21) Appl. No.: 15/388,270

(22) Filed: Dec. 22, 2016

(65) Prior Publication Data

US 2018/0180108 A1 Jun. 28, 2018

(51) Int. Cl.
F16D 13/16 (2006.01)
F16D 13/66 (2006.01)
F16D 13/70 (2006.01)

(52) U.S. Cl.
CPC ............. *F16D 13/16* (2013.01); *F16D 13/66* (2013.01); *F16D 13/70* (2013.01)

(58) Field of Classification Search
CPC .......... F16D 13/14; F16D 13/16; F16D 13/66; F16D 13/70; F16D 13/644
See application file for complete search history.

(56) References Cited

U.S. PATENT DOCUMENTS

| 8,936,143 | B2 | 1/2015 | Wagers |
| 9,115,768 | B2 | 8/2015 | Sturgin |
| 9,644,690 | B2 | 5/2017 | Lee |
| 2014/0014455 | A1 | 1/2014 | Davis |
| 2014/0110207 | A1 | 4/2014 | Davis |
| 2015/0014113 | A1 | 1/2015 | Ohr et al. |
| 2015/0027840 | A1 | 1/2015 | Lee et al. |
| 2015/0060223 | A1 | 3/2015 | Ohr et al. |
| 2015/0083539 | A1 | 3/2015 | Lee et al. |
| 2015/0152921 | A1 | 6/2015 | Lee |
| 2015/0152922 | A1 | 6/2015 | Lee et al. |
| 2016/0032988 | A1 | 2/2016 | He |
| 2016/0069400 | A1 | 3/2016 | Mordukhovich et al. |
| 2016/0084326 | A1 | 3/2016 | Ramsey |
| 2016/0138662 | A1 | 5/2016 | He |
| 2016/0238090 | A1 | 8/2016 | Spencer et al. |
| 2016/0298702 | A1 | 10/2016 | He |
| 2016/0341262 | A1* | 11/2016 | Ramsey .................. F16D 41/18 |

OTHER PUBLICATIONS

International Search Report and Written Opinion for International Application No. PCT/US2018/016155 dated May 15, 2018, 10 pages.
Lee, Brian, "AWD Disconnect, Escaping the clutches of the dog", Schaeffler Symposium 2014, 26 pages.

* cited by examiner

*Primary Examiner* — Huan Le
(74) *Attorney, Agent, or Firm* — Brooks Kushman P.C.

(57) ABSTRACT

A clutch includes a pair of concentric races rotatable about an axis and a disk radially disposed between the races. The disk has edges each engageable with one of the races and has opposing first and second opposing faces extending between the edges. An annular resilient member has a first segment adjacent to the first face and a second segment adjacent to the second face.

19 Claims, 3 Drawing Sheets

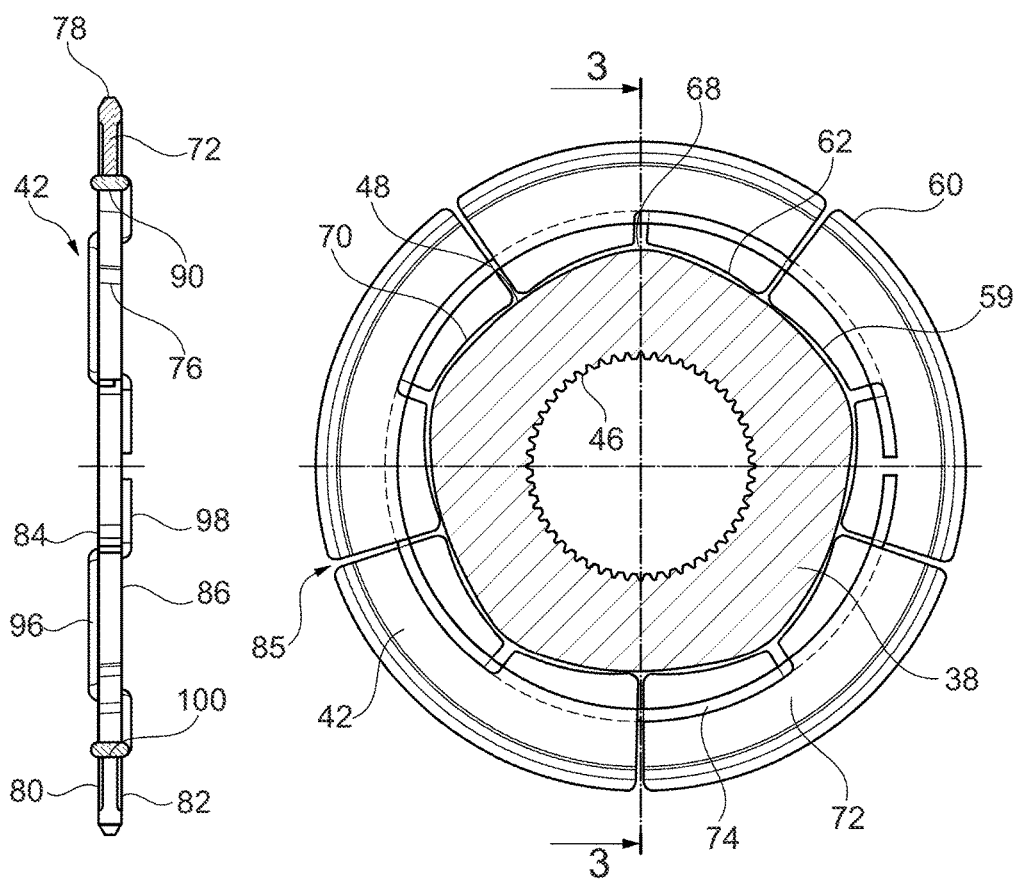

SEGMENTED WEDGE CLUTCH WITH STEPPED RETAINING SPRING

TECHNICAL FIELD

The present disclosure relates to wedge clutches for coupling two or more rotatable elements.

BACKGROUND

A vehicle powertrain may include a wedge clutch for coupling an input shaft to an output shaft. The wedge clutch includes an inner race connected to one of the shafts and an outer race connected to the other of the shafts. A wedge plate is radially disposed between the inner and outer races and is configured to engage the inner and outer races when the clutch is locked to transmit power from the input shaft to the output shaft.

SUMMARY

According to one embodiment, a clutch includes a pair of concentric races rotatable about an axis and a disk radially disposed between the races. The disk has edges each engageable with one of the races and has opposing first and second opposing faces extending between the edges. An annular resilient member has a first segment adjacent to the first face and a second segment adjacent to the second face.

According to another embodiment, a wedge plate for a clutch includes a plurality of wedge segments arranged to form a disk. Each of the segments includes an inner edge, an outer edge, and opposing faces. The inner edges cooperate to form a bore, the outer edges cooperate to form a discontinuous circumferential surface, and the opposing faces cooperate to define first and second sides of the disk. A stepped retaining ring engages with each of the segments to secure the segments together. The retaining ring has a first portion adjacent to the first side of the disk and a second portion adjacent to the second side of the disk.

According to yet another embodiment, a clutch for selectively coupling first and second rotational members. The clutch includes a hub rotatable about an axis and connectable to the first rotational member and a carrier rotatable about the axis and connectable to the second rotational member. The clutch further includes a wedge plate having a first circumferential edge engageable with the hub, a second circumferential edge engageable with the carrier, and first and second radially extending faces. The wedge plate is formed of at least two wedge segments independently moveable relative to each other allowing the wedge plate to expand and frictionally engage between the hub and the carrier to couple the rotational members when the clutch is closed. A stepped retaining ring of the clutch has a first circumferential segment disposed against the first face of one the wedge segments and a second circumferential segment disposed against the second face of the other of the wedge segments.

BRIEF DESCRIPTION OF THE DRAWINGS

FIG. 2 is a partial cross-sectional view of the disk and the hub of the wedge clutch of FIG. 1.

FIG. 3 is a cross-sectional view of the disk taken along cut line 3-3.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
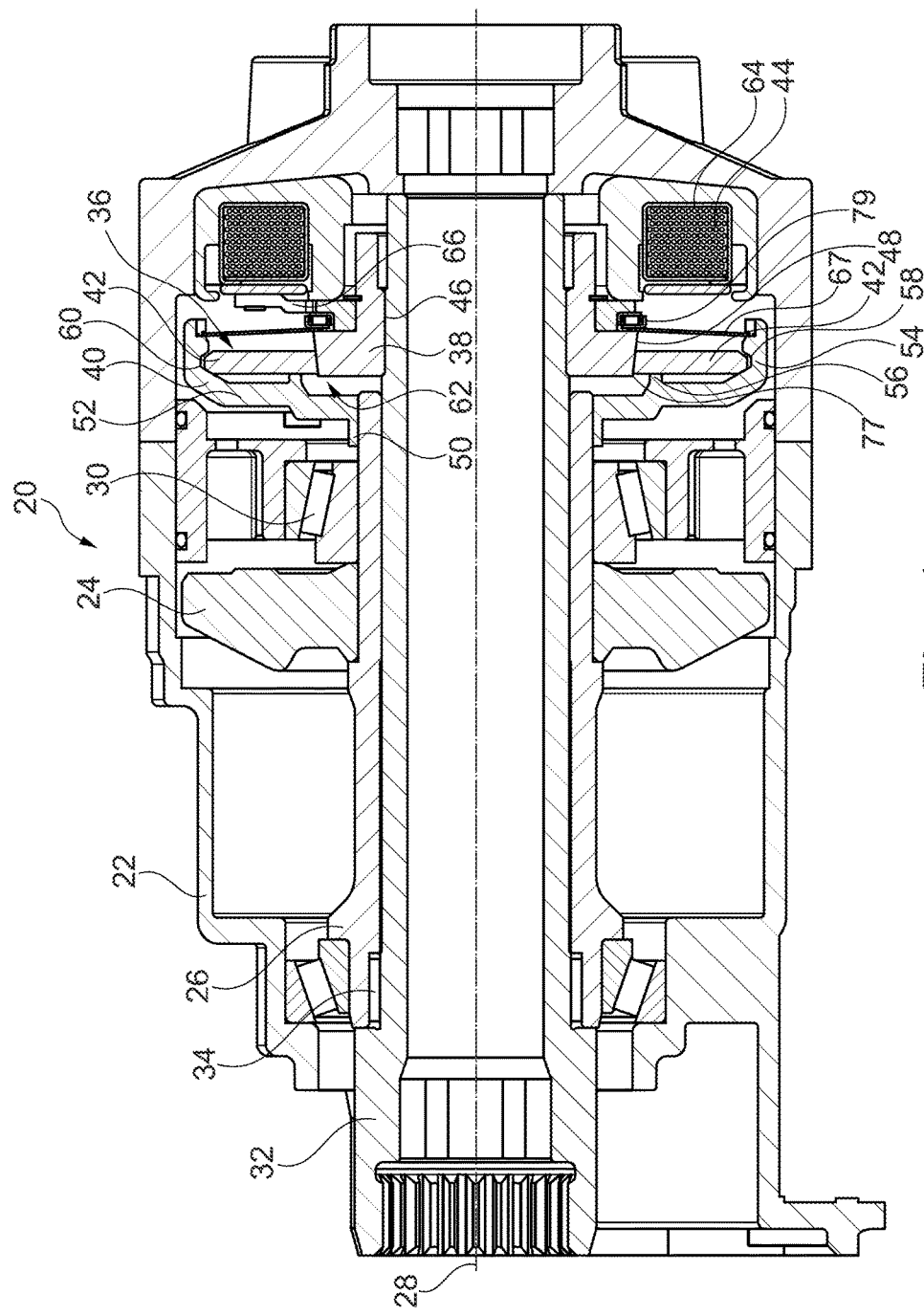
FIG. 1 is a side cross-sectional view of a power transfer unit having a wedge clutch according to one embodiment.

Referring to FIGS. 1 and 2, a power-transfer unit 20 (PTU) for a powertrain is shown. The PTU 20 may be for an all-wheel-drive motor vehicle such as a passenger car or truck. The PTU 20 includes a housing 22 that supports an input shaft 26 for rotation about an axis 28 via bearings 30. A gear 24 may be fixed to the input shaft 26 by a spline connection. The gear 24 may be driveably connected to a transmission output shaft. Two components are driveably connected if they are connected by a power flow path that constrains their rotational speeds to be directly proportional. An output shaft 32 is disposed in the housing 22 and is supported for rotation about the axis 28 via bearings 34.

A wedge clutch 36 is disposed in the housing 22 and selectively couples the input shaft 26 to the output shaft 32 to transfer torque from the input shaft 26 to the output shaft 32. The clutch 36 has a closed state (also referred to as a locked state) in which the input and output shafts are coupled to each other and an open state (also referred to as an unlocked state) in which the input and output shafts are independently rotatable relative to each other. The wedge clutch 36 may include a hub 38 (which may be referred to as an inner race), a carrier 40, and a disk 42 (which may be referred to as a wedge plate) that are all supported for rotation about the axis 28.

The hub 38 includes an inner surface 46 connected to the output shaft 32 and an outer ramped surface 48. The carrier 40 includes a base 50 connected to the input shaft 26, a radially extending portion 52, and an axially extending portion 54 (which may be referred to as an outer race). A projection 56 extends axially from the radially extending portion 52 and engages with the disk 42.

The disk 42 is radially disposed between the hub 38 and the axially extending portion 54. An inner edge 59 of the disk 42 defines a generally circular opening 62 that receives the hub 38 and is seated on the ramped surface 48. An outer edge 60 of the disk 42 is disposed in a groove 58 of the carrier 40. When the clutch 36 is locked, the outer edge 60 frictionally engages with the groove 58 and the inner edge 59 engages with the ramped surface 48 to couple the carrier 40 to the hub 38 creating a power flow path between the input shaft 26 and the output shaft 32.

An actuator 44 moves the clutch between the open and closed states. The actuator 44 may be an electric actuator, as shown, or may be a hydraulic or mechanical actuator. In one embodiment, the electric actuator 44 includes electric coils 64 and an armature 66. The armature 66 is connected to the hub 38 and slides the hub towards the carrier 40 when energized to lock the clutch. A spring 67 may bias the hub 38 away from the carrier 40 to unlock the clutch when the armature 44 is de-energized. In some embodiments, the spring 67 is eliminated in lieu of a bidirectional actuator that also slides the hub 38 away from the carrier 40 to unlock the clutch.

The disk 42 may include multiple segments 72 (also known as wedge segments) retained together by an annular resilient member such as a stepped retaining ring 74. The retaining ring 74 is formed of spring steel or similar material. Each of the segments 72 are annular and collectively form a disk when assembled together. The retaining ring 74 acts as a cage to hold the segments 72 in place. The ramped surface 48 of the hub is not a perfect circle and includes cams 68 that ramp radially outward from the center of the hub 38. The cams 68 cooperate with cams 70 on the inner edge 59 of the disk 42 to force the disk 42 radially outward to engage with the axially extending portion 54 when the clutch is locked. The segments 72 are moveable relative to each other allowing the disk to expand. Having multiple segments aids in the radial expansion of the disk. Multi-segment disks radially expand more uniformly than single-piece disks providing better engagement between the disk 42 and the carrier 40.

The clutch 36 is illustrated in the open state in FIGS. 1 and 2 with the disk 42 being axially located near a first end 77 of the hub, and the disk 42 being loosely disposed in the groove 58 and on the hub 38. Locking of the clutch 36 is initiated by sliding the hub 38 towards the carrier 40 causing the disk 42 to slide on the ramped surface 48. The increasing diameter of the ramped surface 48 expands the disk 42 as it moves towards the second end 79 of the hub 38 increasing friction between the disk 42 and the carrier 40. The friction force between the carrier 40 and the disk 42 decelerates the disk 42 causing relative rotation between the disk 42 and the hub 38. When the disk 42 and the hub 38 rotate relative to each other, the cams 68 and 70 cooperate to further radially expand the disk 42 increasing the frictional engagement with the groove 58 causing the clutch 36 to lock.

Figure 4:
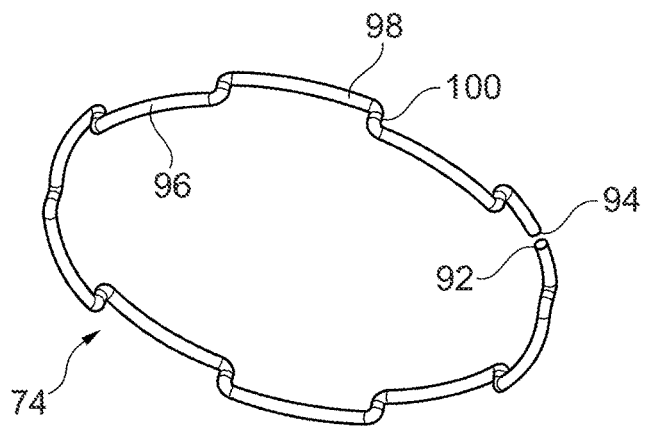
FIG. 4 is a perspective view of a retaining ring of the disk shown in FIG. 2.
Figure 5:
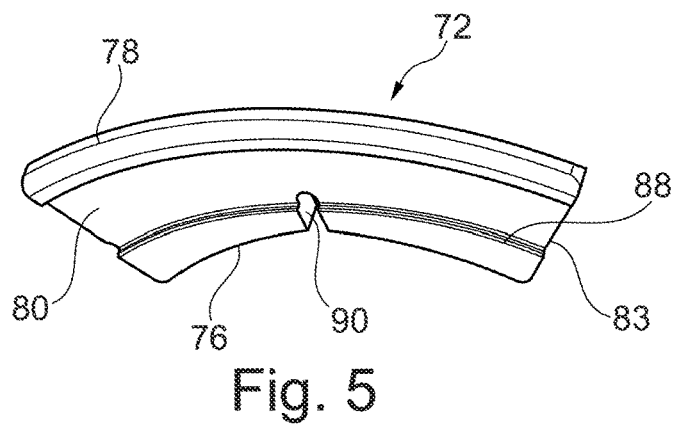
FIG. 5 is a perspective view of an arcuate segment of the disk shown in FIG. 2.

Referring to FIGS. 3, 4, and 5, each of the segments 72 has an inner edge 76, an outer edge 78, a first face 80, a second face 82, and radial edges 83. The inner edge 76 of each of the arcuate segments cooperate to define the inner edge 59 of the disk, and the outer edge 78 of each of the segments cooperate to define the outer edge 60 of the disk. The first faces 80 collectively define a first side 84 of the disk 42, and the second faces 82 collectively define a second side 86 of the disk. Each of the segments 72 also defines a shoulder 88 that projects from a corresponding face and an opening 90 that extends between the first and second faces 80, 82. The arcuate segments 72 are arranged to form the disk 42 with adjacent radial edges 83 spaced apart to form a gap 85.

The retaining ring 74 may be formed of a single piece of metal formed into a generally circular ring with a first end 92 adjacent to a second end 94. The first and second ends 92, 94 are not connected to each other allowing the ring 74 to be easily installed onto each of the segments 72. The retaining ring 74 is bent to form a series of circumferential segments interconnected by axially extending segments. The circumferential segments may be arcuate and the axial segments may be linear. In the illustrated embodiment, the retaining ring 74 includes a first set of circumferential segments 96 disposed on the first side 84 of the disk, a second set of circumferential segments 98 disposed on the second side 86 of the disk, and axially extending segments 100 that extend through the openings 90 or through the gaps 85. Each of the axially extending segments 100 connects between a circumferential segment 96 and a circumferential segment 98. Each of the circumferential segments 96, 98 are disposed on one of the first and second faces 80, 82, respectively, and are seated on one of the shoulders.

The first face 80 of each of the arcuate segments 72 may be engaged with one of the first segments 96 and the second faces 82 may each be engaged with one of the second segments 98. This arrangement allows a single retaining ring to prevent rotation of the segments in both directions. This arrangement also allows for the elimination of retaining clips between the segments 72 and the retaining ring 74, and a groove of other recess is not received to hold the ring in place.

Figure 6:
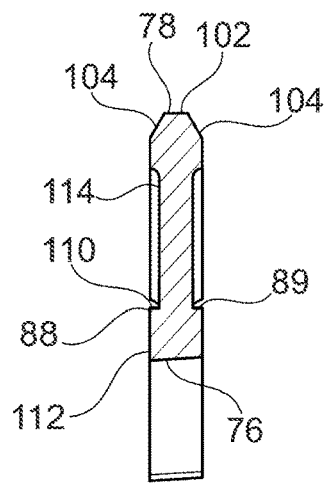
FIG. 6 is a side cross-sectional view of an outer portion of the disk shown in FIG. 2.

Referring to FIG. 6, the outer edge 78 each of the segments 72 may be wedge shaped and include a flat tip 102 and slanted surfaces 104. The slanted surfaces 104 wedge against slanted surfaces of the groove 58 when the clutch is locked. The slanted surfaces provide an increased friction force between the disk 42 and the carrier 40.

Each of the segments 72 includes a first shoulder 88 disposed on the first face 80 and a second shoulder 89 disposed on the second face 82. The first shoulder 88 engages with a different circumferential segment 96, 98 than the second shoulder 89. Each of the shoulders includes a step 110 projecting axially from the face. One of the circumferential segments 96, 98 is seated against each of the steps 110. The steps 110 provide a surface for the retaining ring 74 to engage in order to pull each of the segments 72 towards the center of the disk 42 to disengage the disk and the carrier when the clutch is open. Each of the shoulders also includes a face 112 that extends radially inward from the step 110 to the inner edge 76. The face 112 forms a portion of the other surface of the segment 72 and is axially offset from a main portion 114 of the outer surface.

Wedge clutches may be used in many different applications other than in a PTU. Wedge clutches may be used in any application that requires two or more rotating components to be selectively coupled together. Other possible uses include between a gear and a shaft and any other application in which two or more rotatable member are required to be selectively coupled.

This disclosure is not limited to the illustrated embodiments that show the outer race defining the groove and the inner race defining the ramped surface. In other embodiments, the placement of the hub and carrier are switched with the carrier being the inner race and the hub being the outer race. Here, the inner edge of the disk engages with a groove defined in the inner race, and the outer edge of the disk is disposed on the ramped surface of the outer race. Additional structure and operation of the wedge clutch is provided in the following documents, which are incorporated in their entirety by reference herein: U.S. patent application Ser. No. 15/388,297, filed on the same day as this disclosure; U.S. patent application Ser. No. 15/388,239, filed on the same day as this disclosure; U.S. patent application No. 15/388,213, filed on the same day as this disclosure; U.S. patent application Ser. No. 15/388,292, filed on the same day as this disclosure; and U.S. patent application Ser. No. 15/388,395, filed on the same day as this disclosure.

While example embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated.

What is claimed is:

1. A clutch comprising:
   a pair of concentric races rotatable about an axis;
   a disk including edges each engageable with one of the races and including opposing first and second faces extending between the edges; and
   an annular resilient member including a first segment adjacent the first face, a second segment adjacent the second face, and a third segment connecting between the first and second segments.

2. The clutch of claim 1, wherein the first and second segments are arcuate and extend across a corresponding one of the faces and the third segment is linear and extends through the disk.

3. The clutch of claim 1, wherein the disk defines an aperture extending between the first and second faces, and the third segment extends through the aperture.

4. The clutch of claim 1, wherein the disk is formed of at least two arcuate bodies secured together by the annular resilient member.

5. The clutch of claim 4, wherein the first segment is disposed against one of the bodies, and the second segment is disposed against another of the bodies.

6. The clutch of claim 1, wherein at least one of the faces defines a shoulder and one of the first and second segments is seated on the shoulder.

7. The clutch of claim 1, wherein one of the races defines a ramped surface disposed against one of the edges and having at least one radially extending cam configured to radially expand the disk in response to relative movement between the ramped surface and the disk.

8. A wedge plate for a clutch comprising:
   a plurality of wedge segments arranged to form a disk, each of the segments including an inner edge, an outer edge, and opposing faces, wherein the inner edges cooperate to form a bore, the outer edges cooperate to form a discontinuous circumferential surface, and the opposing faces cooperate to define first and second sides of the disk; and
   a stepped retaining ring engaging with each of the segments to secure the segments together, the retaining ring including a first portion adjacent the first side of the disk and a second portion adjacent the second side of the disk.

9. The wedge plate of claim 8, wherein the first and second portions are arcuate.

10. The wedge plate of claim 8, wherein the retaining ring extends through the disk.

11. The wedge plate of claim 8, wherein at least one of the wedge segments defines an opening and a portion of the retaining ring is disposed in the opening.

12. The wedge plate of claim 8, wherein each of the wedge segments define radial edges that cooperate with adjacent radial edges to define a gap.

13. The wedge plate of claim 8, wherein the retaining ring further includes an axial portion extending through the disk and connecting between the first and second portions.

14. The wedge plate of claim 8, wherein the opposing faces of each wedge segment are in contact with a different one of the first and second portions of the retaining ring.

15. The wedge plate of claim 8, wherein the outer edge defines a pair of opposing slanted surfaces and a flat tip connecting between the slanted surfaces.

16. A clutch for selectively coupling first and second rotational members, the clutch comprising:
   a hub rotatable about an axis and connectable to the first rotational member;
   carrier rotatable about the axis and connectable to the second rotational member;
   a wedge plate including a first circumferential edge engageable with the hub, a second circumferential edge engageable with the carrier, and first and second radially extending faces, wherein the wedge plate is formed of at least two wedge segments independently moveable relative to each other allowing the wedge plate to expand and frictionally engage between the hub and the carrier to couple the rotational members when the clutch is closed; and
   a stepped retaining ring including a first circumferential segment disposed against one of the wedge segments and on the first face and a second circumferential segment disposed against the other of the wedge segments and on the second face.

17. The clutch of claim 16, wherein the stepped retaining ring further includes an axial segment connecting the first and second segments.

18. The clutch of claim 16, wherein a portion of the stepped retaining ring extends through the wedge plate.

19. The clutch of claim 16, wherein at least one of the faces defines a shoulder, and at least one of the first and second circumferential segments is seated on the shoulder.

* * * * *